United States Patent

Tufts et al.

[11] Patent Number: 5,926,804
[45] Date of Patent: Jul. 20, 1999

[54] DISCRIMINANT NEURAL NETWORKS

[75] Inventors: Donald W. Tufts, E. Greenwich, R.I.; Qi Li, Sharon, Mass.

[73] Assignee: The Board of Governors for Higher Education, State of Rhode Island and Providence Plantations, Providence, R.I.

[21] Appl. No.: 08/270,045

[22] Filed: Jul. 1, 1994

[51] Int. Cl.$^6$ .................................................. G06F 15/18
[52] U.S. Cl. .............................................. 706/25; 706/16
[58] Field of Search ................................ 395/23, 21, 24; 706/25, 16

[56] References Cited

U.S. PATENT DOCUMENTS

| 5,359,700 | 10/1994 | Seligson | 395/24 |
| 5,469,530 | 11/1995 | Makrak-Ebeid | 395/24 |
| 5,490,236 | 2/1996 | Niki | 395/23 |

OTHER PUBLICATIONS

Baum et al., Constructing hidden units using examples and queries, Advances in neural processing systems 3, 1991, pp. 904–910.

Baum, Neural net algorithms that learn in polynomial time from examples and queries, IEEE transactions on neural networks, pp. 5–19, Jan. 1991.

Strobach, A neural network with boolean output layer, International conference on Acoustics, Speech and Signal processing, pp. 2081–2084, Apr. 6, 1990.

Farrell et al., Speaker identification using neural tree networks, IEEE International conference on acoustics, speerh and signal processing, pp. I/165–I/168, Apr. 22, 1994.

Koutsougeras et al., Training of a neural network for pattern classification based on an entropy measure, IEEE international conference on neural networks, pp. 247–254, Jul. 27, 1988.

Monrocq, A probabilistic approach which provides a modular and adaptive neural network architecture for discrimination, Third international conference on artificial neural network, pp. 252–256, May 27, 1993.

Moore et al., Characterizing the error function of a neural network, Proceedings. The second symposium on the frontiers of massively parallel computation, pp. 49–57, Oct. 12, 1988.

Williams, Improved generalization and network pruning using adaptive laplace regularization, Third international conference on artificial neural networks, pp. 76–80, May 27, 1993.

Diaz et al., SLHMM: a continious speech recognition system based on Alphanet–HMM, IEEE international conference on acoustics, speech and signal processing, pp. I/213–16, Apr. 22, 1994.

*Primary Examiner*—Robert W. Downs
*Assistant Examiner*—Sanjiv Shah
*Attorney, Agent, or Firm*—Samuels, Gauthier & Stevens

[57] ABSTRACT

A discriminant neural network and a method of training the network are disclosed. The network includes a set of hidden nodes having associated weights, and the number of hidden nodes is minimized by the training method of the invention. The training method includes the steps of 1) loading a training data set and assigning it to a residual data set, 2) computing a vector associated with a first hidden node using the residual data set, 3) projecting training data onto a hyperplane associated with said first hidden node, 4) determining the number and locations of hard-limiter thresholds associated with the first node, and 5) repeating the above for successive hidden nodes after removing satisfied subsets from the training data until all partitioned regions of the input data space are satisfied.

6 Claims, 8 Drawing Sheets

| Region | $y_1$ | $y_2$ | $y_3$ | $y_4$ | Class | d |
|---|---|---|---|---|---|---|
| I | 1 | 1 | 0 | 1 | X | 0 |
| II | 0 | 0 | 0 | 1 | 0 | 1 |
| III | 0 | 1 | 1 | 1 | 0 | 1 |
| IV | 0 | 1 | 0 | 0 | 0 | 1 |
| V | 0 | 1 | 0 | 1 | X | 0 |
FIG. 6A
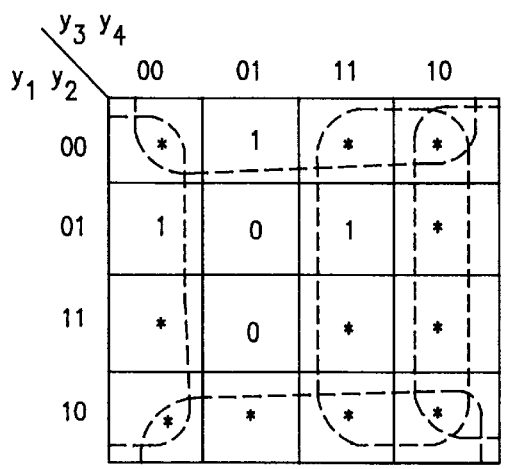
FIG. 6B
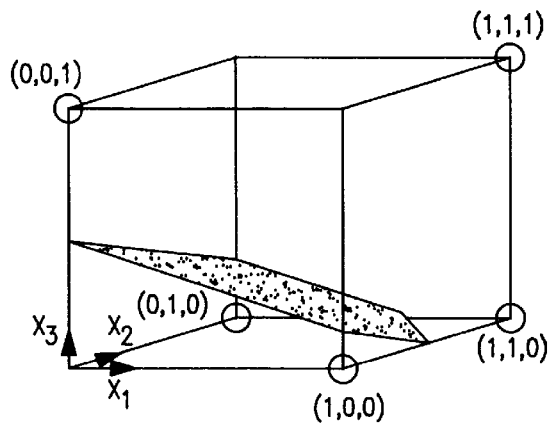
FIG. 8A
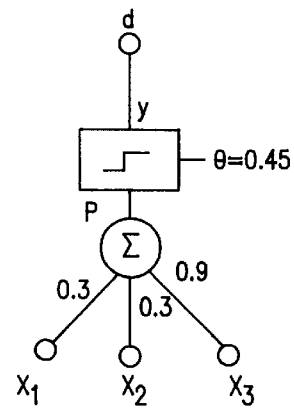
FIG. 8B
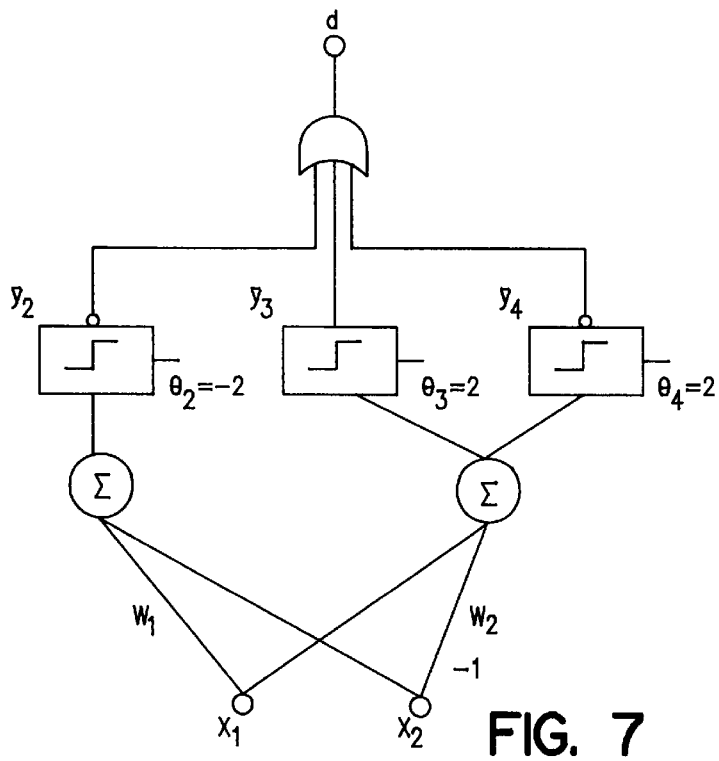
FIG. 7

| Region | $y_1$ | $y_2$ | $y_3$ | Class | $d_1$ | $d_2$ |
|---|---|---|---|---|---|---|
| I | 1 | 1 | 1 | X | 0 | 0 |
| II | 0 | 1 | 0 | O | 0 | 1 |
| III | 0 | 0 | 1 | + | 1 | 0 |
| IV | 0 | 0 | 0 | * | 1 | 1 |
FIG. 10A
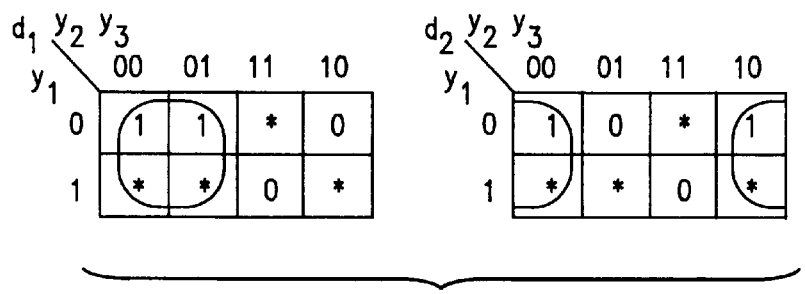
FIG. 10B
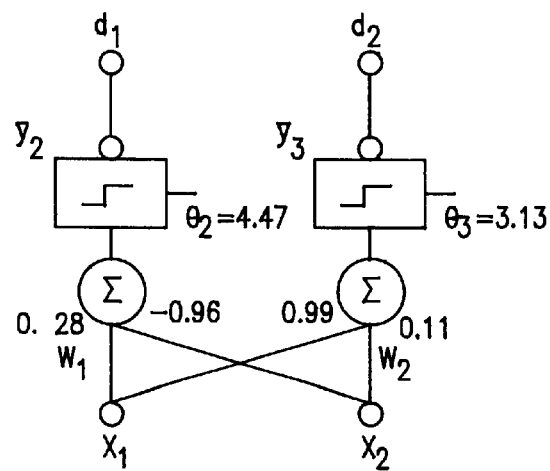
FIG. 11

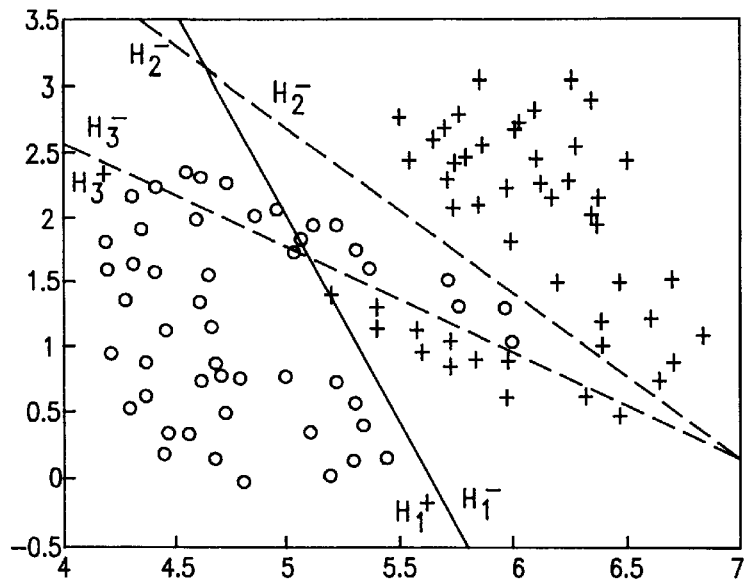
FIG. 12
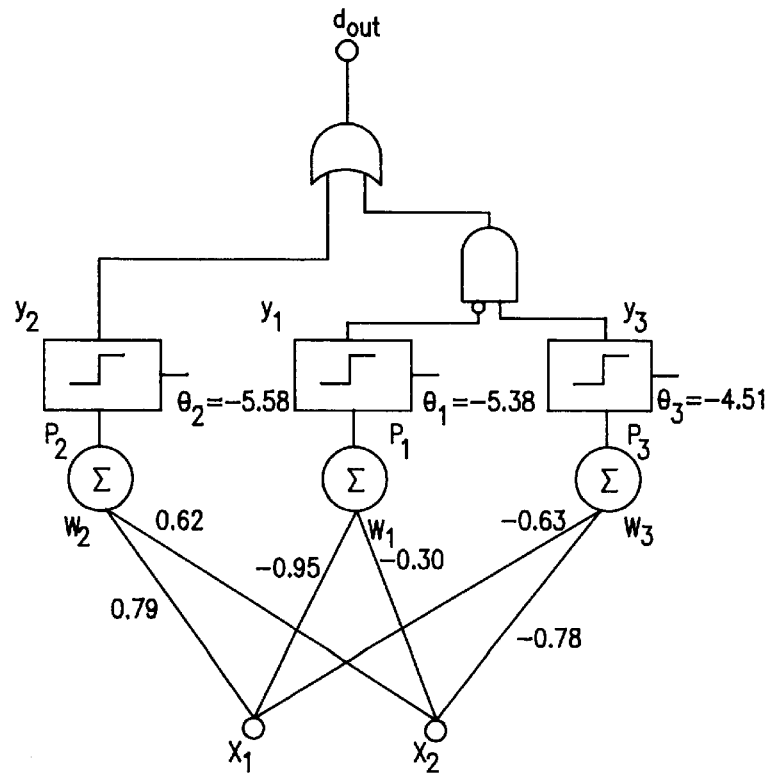
FIG. 13A
FIG. 13B

DISCRIMINANT NEURAL NETWORKS

BACKGROUND OF THE INVENTION

This invention relates to self configuring electrical circuits known as neural networks, and in particular relates to feedforward neural networks.

Neural networks are generally able to modify themselves during use to favor certain desired connection paths over others and thereby mimic the learning process of association in brains. Neural networks are used in a variety of applications such as pattern recognition and data classification due to their ability to be trained and thereby learn.

Currently, most training criteria and learning rules are defined based on the principle of minimizing the distance between a desired output vector and the actual output vector. The related learning algorithms are developed based on gradient descent methods, such as backpropagation and improved versions thereof. There are, however, a number of practical concerns for gradient training algorithms. First, the basic training algorithms can determine the number of hidden nodes only by retraining many times with different numbers of nodes. Second, the training often converges into a local minimum instead of a global minimum, and third, gradient-based training usually requires an unacceptably long period of time.

To determine the number of hidden nodes, several pruning algorithms have been developed, but pruning only reduces the initial starting set of nodes and is not always efficient. Design methods have also been proposed for computing the number of hidden nodes and initial weights. Although these methods can reduce the training time using backpropagation, they are not efficient in all situations such as with certain classification systems. Training algorithms have further been developed based on the concept of using hidden nodes to partition the input space. However, in some situations more hidden nodes are sometimes used than are necessary.

There is a need, therefore, for a neural network system that avoids the shortcomings of backpropagation and gradient descent training algorithms.

There is also a need for a faster and more efficient method of partitioning the input space with fewer hidden nodes.

SUMMARY OF THE INVENTION

The invention provides a new class of neural networks that utilize discriminant analysis. Such networks are relatively simple in design yet highly effective and readily trainable. In particular, the training method of the invention permits the sequential determination of the needed hidden nodes and the values of the associated weights for pattern recognition and data classification.

The discriminant neural networks of the invention are feedforward networks and may include multiple biased-hard-limiter nonlinearities associated with each hidden node. Each output node produces the values of a logic function of the binary digits from the hidden nodes. With this method, each of the required hidden nodes, the weight vector associated with each hidden node, and the biases for the hard-limiting nonlinearities may be sequentially determined. Moreover, performance potential is improved, in part, because the possibility of whether to add a hidden node may be considered at each stage of the design.

The training process in accordance with the invention separates the network training into the training of each layer of the network. The input layer is designed to partition the input data space using linear discriminant functions, and the training starts from one hidden node. By applying a linear discriminant algorithm, a separable subset of the data is deleted from the training set. Specifically, significant attributes of the training data for each new hidden node are sequentially extracted and stored. The vectors in the training set that have already been identified as classifiable are deleted after each stage and discriminant analysis is applied to the residual training data. A hidden node is added to the network when needed, i.e., when the classification performance on the training set is not yet sufficient. Thus, the training data set is reduced sequentially while the training is in progress. Each node of the output layer performs a logic function of the binary outputs of the hidden nodes. Boolean minimization can be used to train the output nodes and prune unnecessary hidden nodes.

The invention avoids shortcomings related to backpropagation and other gradient descent training algorithms, such as long training time, convergence, and the determination of the proper number of hidden nodes, by improving the network structure and integrating the design and training of a feedforward neural network.

BRIEF DESCRIPTION OF THE DRAWINGS

The following detailed description may be further understood with reference to the accompanying drawings in which:

FIGS. 6a and 6b are respectively a logic truth table and a Karnaugh map for the system of FIG. 3;

FIG. 7 is a diagram of a circuit for implementing the system of FIG. 3;

FIG. 8a is a diagrammatic view of the data and a hyperplane for, and FIG. 8b is a diagram of a circuit for implementing the system of, Example 1;

FIG. 10a is a logic truth table for, and FIG. 10b is a Karnaugh map for, the system of Example 2;

FIG. 11 is a diagram of a circuit for implementing the system of Example 2;

FIG. 12 is a data cluster graph showing data for Example 3; and

FIG. 13a is a Karnaugh map for, and

FIG. 13b is a diagram of a circuit for implementing the system of, Example 3.

DESCRIPTION OF THE PREFERRED EMBODIMENTS

The invention provides a procedure for the design and training of hardware or software classifiers which is based on linear discriminant analysis as proposed by R. A. Fisher in 1938.

Unlike the conventional applications of discriminant analysis, however, the system of the invention applies the analysis recursively to successive training data residuals and evaluates performance of a corresponding neural network on the current reduced training data set after each step to decide whether or not to stop or to continue the design. If the procedure is continued some training vectors are deleted from the residual training data set from the previous design step before calculating the next hidden node weight vector.

The present method is applicable to a wide class of classification problems and simplifies the determination of the required structure and complexity of feedforward neural networks. Each input pattern is treated as a vector of n real numbers $x=[x_1, x_2, \ldots, x_n]^t$. Each hidden node is characterized by a set of one or more parallel n−1 dimensional hyperplanes in the input space.

The hyperplanes of the hidden nodes separate the training data into regions. Each region is represented by a binary word of the outputs of the hidden nodes. The output nodes are logic functions of the binary outputs of the hidden nodes.

Figure 1:
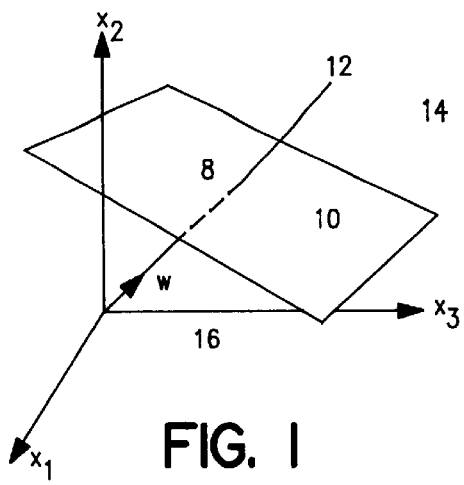
FIG. 1 is a diagrammatic view of a weight vector and hyperplane of one hidden node.

As shown in FIG. 1, the hyperplane H (shown at 10) is characterized 1) by the line L (shown at 12) through the origin which is perpendicular to the hyperplane and 2) by a threshold θ, which is the value of the projection of any point of the hyperplane onto the line. If $w=[w_1, w_2, \ldots, w_n]^t$ is a vector of unit length from the origin which is on the line, then any point in the hyperplane must satisfy the equation $$\sum_{i=1}^{n} x_i w_i = \theta \quad (1)$$

in which θ is the threshold value. Using vector notation in which $x^t$ is the transpose of the column vector x, the equation can be rewritten as $$x^t w = \theta \quad (2)$$

New hidden nodes are sequentially added as needed. Once it is determined that another hidden node is needed by evaluating the current performance of the network on the training data, it is trained by calculating a new linear discriminant function which is specified by a new weight vector w. Each threshold value θ associated with the current hidden node is determined by analysis of the distribution of training data points that have been projected onto the L by the inner product which defines the discriminant function. A value of θ specifies the location of a hyperplane perpendicular to the line, that partitions the input space into two subsets, $H^+$ and $H^-$ (shown at 14 and 16 respectively).

The rule for determining the value of θ is that all or most of the data on one side of H belong to one class and this data set is called a satisfied subset. Data on other side of H may require further training and is called an unsatisfied subset. Further training means that another hard-limiter with a new value of bias θ is added to partition the previous unsatisfied subset into satisfied and possibly unsatisfied parts, if possible. If not, and if the performance of the network is not yet sufficient, the training data can be reduced by subtracting the satisfied subset, adding a new hidden node, and determining its weight vector. At all stages, the misclassification rate in the satisfied subsets must meet the design specification, and the rate is checked while determining the threshold. After a hidden node is trained and if the performance on both $H^+$ and $H^-$ is satisfactory, the design procedure stops and no more hidden nodes are added.

Figure 3A:
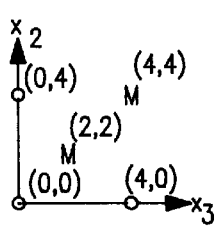
FIGS. 3a–3h are diagrammatic views of the input space during the projection and partitioning processes.
Figure 2:
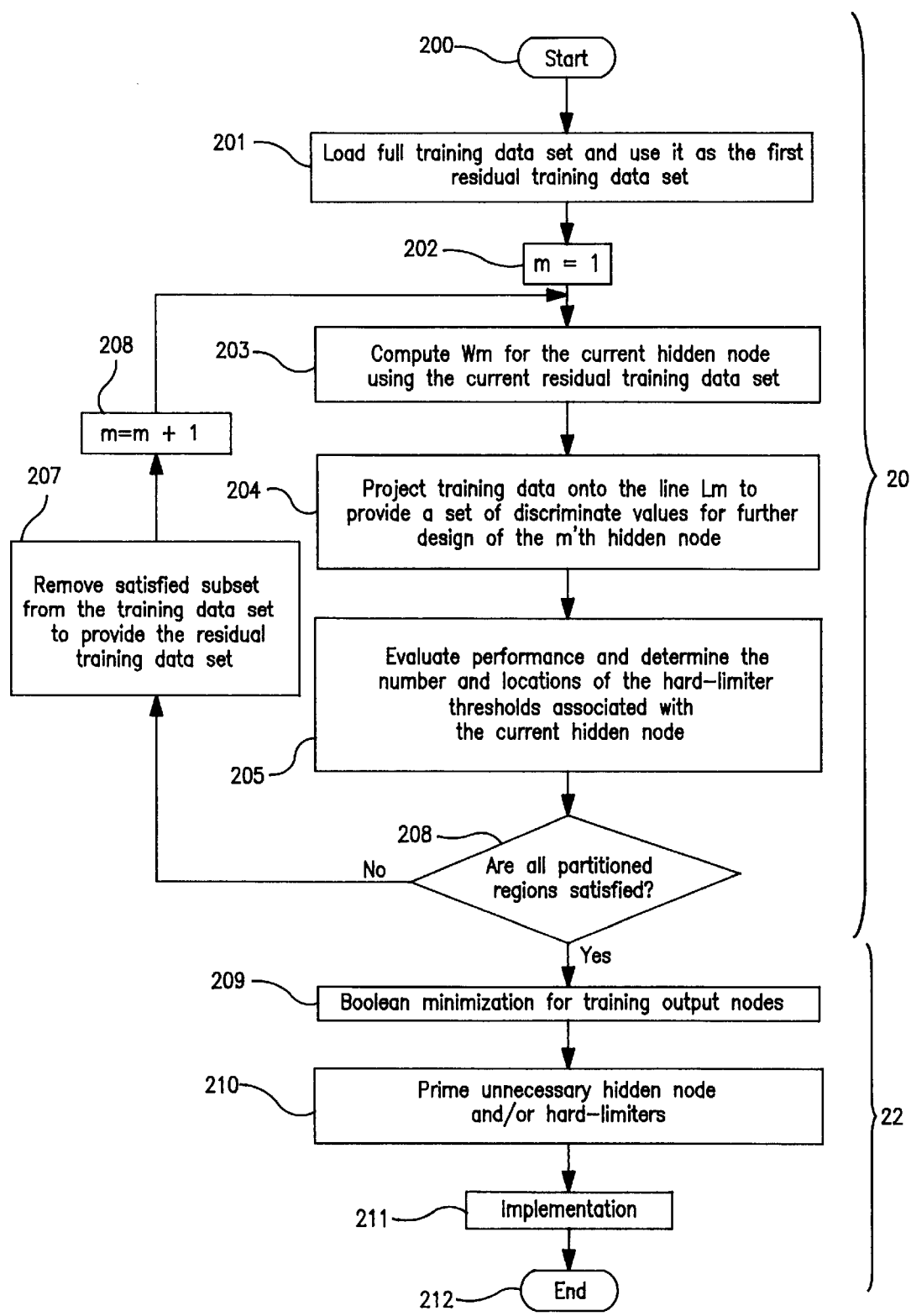
FIG. 2 is a process flow chart of a design system in accordance with the invention.

An overview of the design method is shown in the flowchart of FIG. 2. The design and training can be separated into two stages, hidden node training (shown at 20) and output node training (shown at 22). In the first stage, the weight vector for each node and the threshold values for its hard-limiters are calculated. In the second stage, logic functions from the binary variables of the hidden nodes and the binary value of each output node are specified. A relatively simple example of the system of the invention is presented below with reference to FIG. 3 to illustrate the basic concepts of the design method. The example includes an input space having two classes of training data (x and o) that are not separable by a single hyperplane, i.e., they are not linearly separable, as shown in FIG. 3a.

Figure 3B:
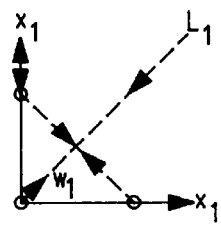
Figure 3C:
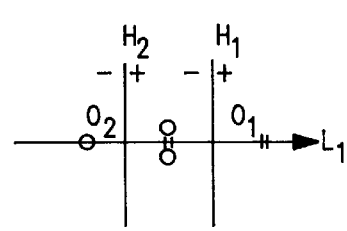
Figure 3D:
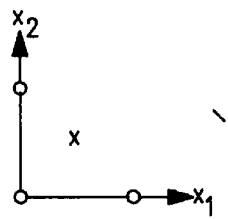
Figure 3E:
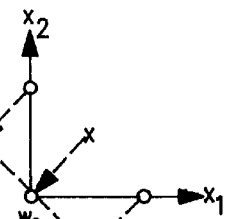
Figure 3F:
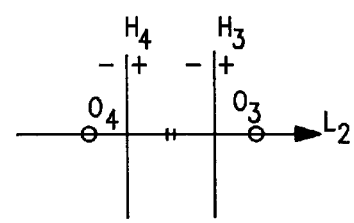
Figure 3G:
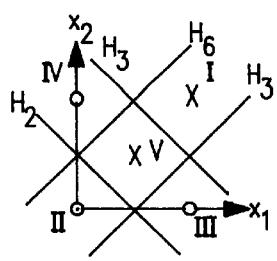

The training method starts (step 200) with all five training data points (step 201) and applies a linear discriminant algorithm to determine the weight vector $w_1$. The weight vector $w_1$ of the first hidden node (step 202) is calculated (step 203) to be $w_1=[0.707, 0.707]^t$, as shown in FIG. 3b. The inner products of the weight vector and the individual data vectors project all data onto the line $L_1$ in the direction of $w_1$ (step 204). The dotted lines in FIG. 3b show the projection and FIG. 3c shows the line $L_1$ with the projected data. The thresholds $\theta_1$ and $\theta_2$ are determined (step 205) at the bisectors between two nearby clusters for hyperplane $H_1$ and $H_2$ respectively as shown in FIG. 3c. This process repeats for each hidden node (step 206) until all partitioned regions are satisfied. Again with reference to FIG. 3c, the data (4,4) and (0,0) are separated by the hyperplanes, then deleted from the input space (step 207). Only the data remaining in FIG. 3d is used to calculate the weight vector for the next hidden node (step 208). The calculated $w_2=[0.707, -0.707]$ and the projection line $L_2$ are shown in FIG. 3e. The thresholds $\theta_3$ and $\theta_4$ can then be determined for $H_3$ and $H_4$ as shown in FIG. 3f. FIG. 3g shows all four hyperplanes which separate the clusters into regions. The data in each region belongs to one class.

Figure 3H:
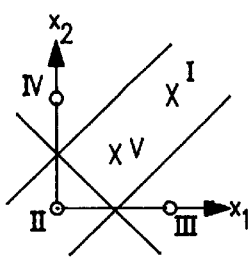

The four hyperplanes can be further reduced by three by applying Boolean minimization in the training for the output node (step 209), and pruning unnecessary hidden nodes and/or hard-limiters (step 210). The three hyperplanes are shown in FIG. 3h, and one implementation (step 211) is discussed below with reference to FIG. 7. The process then ends (step 212).

In Table I, the results of this training method are compared with backpropagation and a training algorithm based on Voronoi diagrams (VoD). For this example, the training speed of the method is about $10^3$ and $10^5$ times faster than backpropagation (when backpropagation converges). Information to compare the speed with the VoD method is not yet available to the Applicants, but the synthesized network of the present method uses only three nodes while the Voronoi diagram method requires 12 nodes.

TABLE I

Comparison of Three Training Methods

| Algorithms | FLOPS in Training Tolerance < 0.01 | FLOPS in Training Tolerance < 0.1 | Nodes | Forward Operations |
|---|---|---|---|---|
| Backpropagation | 1.37– 1.38 × $10^7$ | 2.09– 6.35 × $10^5$ | 2 + 1 | Multiplier: 6 Sum: 3 Sigmoid: 8 |
| Voronoi Diagrams | — | — | 5 + 5 + 2 | Inverter: 8 Sum: 12 Hardlimiter: 12 |
| Discriminant networks | 7.54 × $10^2$ | 7.54 × $10^2$ | 2 + 1 | Inverter: 3 Sum: 2, OR: 1 Hardlimiter: 3 |

As shown in Table I, the number of required floating point operations (FLOPS) is significantly reduced by the method of the invention as compared to backpropagation, and the number of nodes is significantly improved over the VoD method.

Further, as shown in Table II, discriminant networks perform favorably under for a variety of characteristics.

TABLE II

Further Comparison of Training Algorithms

| Algorithms | Epoches | CPU Time (seconds) | FLOPS | Sum-Square Error | Number of Nodes | OR/AND Gates |
|---|---|---|---|---|---|---|
| Backpropagation | 1e + 4 | 529 | 1.29e + 8 | 5.67 | 5 | 0 |
| Backpropagation | 1e + 6 | 74211 | 8.61e + 9 | 4.35 | 5 | 0 |
| Radial Basis Function | 1 | 35.52 | 1.97e + 7 | 0.13 | 56 | 0 |
| Discriminant Networks | 1 | 0.20 | 7.18e + 3 | 0.00 | 2 | 2 |

Discriminant networks trained in accordance with the invention are therefore readily trainable in a minimum amount of time and require a minimum of hardware for implementation. A description of the system is now presented in further detail followed by a description of the process for synthesizing the system.

The System

Figure 4:
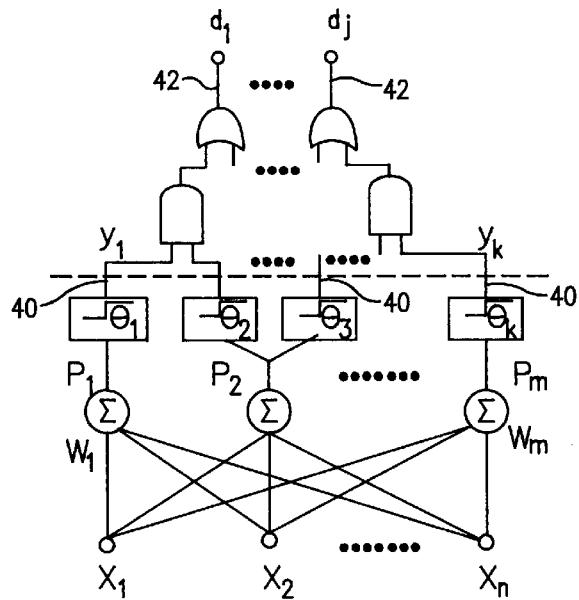
FIG. 4 is a logic diagram of a preferred embodiment of a discriminant neural network in accordance with the invention.

FIG. 4 shows a recommended implementation for a Discriminant Neural Network (DNN) in accordance with the invention. The network includes two kinds of nodes, hidden nodes 40 and output nodes 42. The output of each hidden node is a word "y" of one or more binary digits, and the number of binary digits correspond to the number of biased hardlimiters which are used in each hidden node. The bias value of hardlimiter may be referred to as a threshold value. The training for a hidden node includes the determination of the weight vector w, the number of hardlimiters and the threshold, or bias, value for each hardlimiter. The training for the output nodes "d" is the design of a minimal logic-function mapping from the binary outputs of the hidden nodes to the binary outputs of the output nodes. Each output binary word of the output nodes specifies a class associated with the input pattern.

The circuit shown in FIG. 4 is preferred due to its simplicity for design and implementation. The digital output layer and the hidden nodes, without sigmoid functions, provide great advantages in implementation, particularly for VLSI design of neural network chips. However, one can still implement the designed neural network by a multilayer perceptron network (MLP) since any basic logical units for the output nodes (OR, AND, etc.) can be replaced by one or two perceptrons.

Any decision region of a discriminant network, like that of FIG. 4, in the input space is formed as intersections of half-spaces specified by the hyperplanes associated with the weight vectors and the biased hardlimiters of the hidden nodes, and thus each decision region can be specified by the binary output word of the hidden nodes. With the output nodes performing Boolean functions, the network of FIG. 4 can be applied to any classification problem for which the input data, or pattern, are real valued or can be processed as real numbers.

The hidden nodes are the basic elements of the DNN. For each hidden node, all data in the input space will be projected onto a line L, which is characterized by a weight vector w. The vector of projected data values p is defined by $$p = Xw, \quad (3)$$

where X is a r×n matrix of real-valued training data in which each row is a training pattern for one of the data classes. Each component of an input vector is treated arithmetically as a real number, even if it was originally a binary number. Each hidden node will have a distinct weight vector. The output of one of the biased hardlimiters of one hidden node in response to a given data vector x, or call pattern, is $$y = f(x^t w), \quad (4)$$

in which $x^t w$ is the inner product of the vector x and w.

$$f(x^t w) = \begin{cases} 1, & x^t w > \theta; \\ 0, & x^t w \leq \theta. \end{cases} \quad (5)$$

where f is a biased hardlimiter nonlinearity, and θ is a threshold value that can also be considered as a bias for the argument of the nonlinearity.

The discriminant and the choice of weight vectors is presented below with reference to a system having two classes of vectors in the n-dimensional input space and the use of the current hidden node to separate the two classes. To determine the weight vector w, a direction for w is first determined so that the normalized separation between the two clusters of projected data from the classes is as large as possible. The solution to this projection problem is commonly referred to as discriminant analysis.

For a two-class classification problem, the criterion function J in Fisher's linear discriminant can be written as $$J_{max}(w) = \frac{w^t S_B W}{w^t S_W w} \quad (6)$$

where $$S_B = (m_1 - m_2)(m_1 - M_2)^t \quad (7)$$

and $$S_W = \sum_{x \in X_1} (x - m_1)(x - m_1)^t + \sum_{x \in X_2} (x - m_2)(x - m_2)^t \quad (8)$$

where $X_1$ and $X_2$ are the data sets of two different classes. The $m_1$ and $m_2$ are the sample means of the two classes. And $S_W$ is a linear combination of the sample convariance matrices of the two classes.

It is assumed that $(m_1 - m_2)$ is not the zero vector. If it is zero or close to zero, then a different training method should be applied to design the hidden nodes.

The problem of Equation (6) is the well known Generalized Rayleigh's Quotient problem. The weight vector w is the eigenvector associated with the largest eigenvalue of the following generalized eigenvalue problem.

$$S_B w = \lambda S_W w \quad (9)$$

The example in FIG. 3 is a special case. The two weight vectors can be solved together while the $w_1$ is the eigenvector associated with the largest eigenvalue and the $w_2$ is the eigenvector associated with the second eigenvalue.

When $S_W$ is nonsingular, the above equation can be written as the following conventional eigenvalue problem:

$$S_W^{-1} S_B w = \lambda w \quad (10)$$

Since $S_B$ has rank one and $S_B w$ is always in the direction of $m_1 - m_2$, there is only one nonzero eigenvalue and the weight vector w can be solved direction as $$w = \alpha S_W^{-1}(m_1 - m_2) \quad (11)$$

in which α is a constant that can be chosen for normalization or to make inner products with w computationaly simple in implementation.

For multiple class problem, Equation (7) above becomes $$S_B = \sum_{i=1}^{c} r_i(m_i - m)(m_i - m)^t, \quad (12)$$

where, $m_i$ is the mean of class i, $r_i$ is the number of training data vector in class i, and m is the mean vector of all classes, and the Equation (8) becomes $$S_W = \sum_{i=1}^{c} \sum_{x \in X_i} (x - m_i)(x - m_i)^t. \quad (13)$$

The generalized eigenvalue problem may then be solved as in Equation (9) above.

To reduce the number of floating point operations, the problem stated in Equation (6) can also be converted to the conventional eigenvalue problem by making a change of variable $$w' = S_W^{1/2} w. \quad (14)$$

then, $$J_{\max}(w') = \frac{w'^t S' w'}{w'^t w'} \quad (15)$$

where $$S' = S_W^{-1/2} S_B S_W^{-1/2}, \quad (16)$$

The vector w' will be the eigenvector associated to the largest eigenvalue in solving Equation (15). The weight vector w can be obtained by $$w = S_W^{-1/2} w'. \quad (17)$$

Since w is a vector, it can be scaled or normalized by a constant without changing its direction. For example, if w is scaled by the first element $w_1$ as in Equation (18) below, the first weight $w_1$ will be always equal to 1. This method can save one multiplication in all hidden nodes. By using other scalable factors, one can also make the weights to be close to values that can be easily implemented, for example by shift operations for a fast inner product calculation, $$\hat{w} = w/w_1. \quad (18)$$

The thresholds for the hardlimiters may be determined as follows. Once the weight vector w is determined, the calculation of p=Xw projects all of the currently used data vectors onto one dimension as real values. Thresholds then need to be determined to locate the hyperplanes. The hyperplanes will partition the current input space into several subspaces. The goal is to have the data in one subspace (or most of it belong to same class depending on the allowed misclassification rate in design specifications. The data in the subsets that satisfied the misclassification rate will be deleted from the training data set. Only the subsets that do not meet the desired rate will be carried over to the training of the next hidden node. To assist in analysis, the histograms in FIG. 5 are referenced to illustrate the distribution density of the projected data n the line L.

FIG. 5 shows examples of various types of histograms of projected data values in accordance with Equation (3). FIG. 5a is a linearly separable case. A threshold located in the center between the two data clusters can be used to completely separate the two classes. In FIG. 5b, the two classes overlap with each other. They cannot be completely separated by one hidden node. This means that more hidden nodes will be needed after training the current one if the desired misclassification rate is zero. For this cases, two thresholds can be set on $\theta_1$ and $\theta_2$ associated with the hyperplanes $H_1$ and $H_2$. Then the data projected only half-spaces of $H_1^+$ and $H_2^-$ can be removed from the current training set. Only the data projected onto $H_1^- \cap H_2^+$ will be used for training the next hidden node.

Figure 5A:
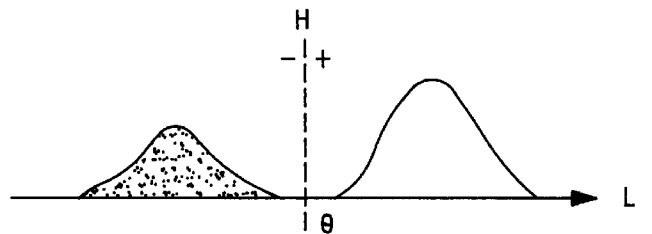
FIGS. 5a through 5d are examples of different histograms of projected data values for one hidden node.
Figure 5B:
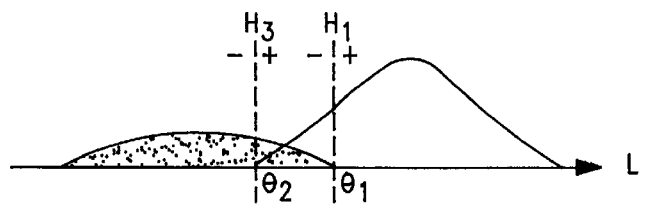
Figure 5C:
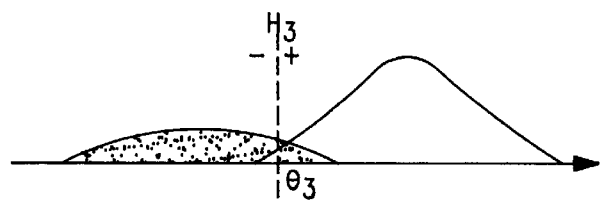

If the training data in FIG. 5b is large enough to present a representative statistical distribution and if a non-zero misclassification rate is given in the design specifications, a threshold $\theta_3$ may be set for one hyperplane $H_3$ as in FIG. 5c. By doing so, the network may exhibit improved generality on new data outside the training set, and the total number of hidden nodes or hardlimiters can be reduced.

Figure 5D:
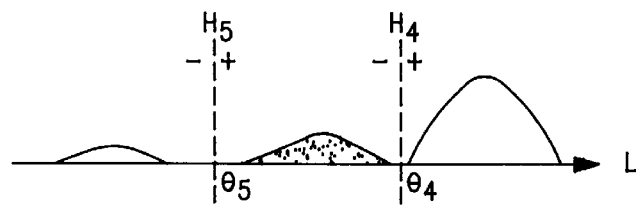

In FIG. 5d, two classes of data with different means are in three clusters. Since the three clusters include one weight vector and two thresholds, $\theta_4$ and $\theta_5$, the clusters can be totally separated, and no more hidden nodes are needed. This concludes the presentation of the basic distributions of projected data. Other cases including multiple class discriminant can be treated as a combination of these basic cases in determining the thresholds of each hidden node.

The design of the output nodes is now presented beginning with the design of the portion of the DNN from the binary outputs of the hidden nodes to the binary network outputs. The computations of the output nodes can be implemented by logical circuits, so the design of the output nodes may utilize Boolean minimization.

As in logical circuit design, a truth table should be prepared. Each row represents one region in the partitioned input space, specified by a binary word from the hidden nodes. For separation of two classes only one binary valued output node is needed. Using the example in FIG. 3, FIG. 6a is a truth table associated with the separated regions in FIG. 3g.

A Karnaugh map is then applied to the logic circuit design to minimize the logic function. Other types of reduction programs such as CAD software may be used. The hidden nodes or hard-limiters that are not used in the minimized logic functions can be pruned. FIG. 6b is the Karnaugh map from the truth table in FIG. 6a in which asterisks "*" denote "don't care" variables. A minimized output function for the example in FIG. 3 is $d = \bar{y}_2 + y_3 + \bar{y}_4$ in which "+" is used to denote logical operator "OR". This shows that only the three binary digits $y_2$, $y_3$, and $y_4$ from the hidden nodes are needed for classification. The hidden node output $y_1$ is deleted by the Boolean minimization, so the associated hyperplane $H_1$ and its hard-limiter can be pruned. FIG. 3h shows the partitioned input space corresponding to minimized implementations.

FIG. 7 shows the final minimized design for the example of FIG. 3 using logical output nodes and perception output nodes. The component values of the weight vectors are scaled to 1 and −1 to simplify the implementation without changing the directions of the vectors $w_1$ and $w_2$.

Synthesizing The System

A procedure for synthesizing the design method of the invention is as follows. Initially, it is assumed that the difference of the sample mean vectors, $m_i - m$ is not zero, where $m_i$ and m are defined below in accordance with Equation (12). If it is zero or very close, then a different training method should be applied to design the hidden nodes, such as is described by E. Wilson, S. Umesh, and D. W. Tufts in "Designing a neural network structure for transient detection using the subspace inhibition filter algorithm," the Proceeding of IEEE Oceans Conference, Vol. 1, pp. 120–125, 1992, the disclosure of which is incorporated herein by reference.

Steps 1–6 below relate to the process of synthesizing the hidden layers, and steps 7–10 relate to the process of synthesizing the output-layer logic function and of pruning the hidden nodes.

First, the design specifications, such as the allowed misclassification rate, must be prepared, followed by the training data set, the matrix X, and the desired output d. The initial residual training data set should be the full data set and the initial satisfied data set should be the null set. Second, $S_B$ should be calculated in accordance with Equations (7) and (12), and $S_W$ in accordance with Equations (8) and (13) based on the current residual training data set. Note that the residual training data will be reduced when and if the procedure returns to this step. Third, the generalized eigenvalue problem stated in Equations (9) and (15) should be solved. The eigenvector associated with the largest eigenvalue is the weight vector w for the current hidden node. Fourth, the vector p of projected data values, p=Xw, for the current node should be calculated based on the weight vector w from Step 3 above and the current residual data set X. Fifth, the algorithm discussed above with reference to FIG. 5 should be used to determine one or more threshold values and the location of the corresponding hyperplanes. Satisfied data sets separated by the hyperplanes are then determined while training the thresholds based on the design specifications. The residual data set should be updated by removing the new satisfied data sets. Sixth, if performance of the current set of hidden nodes is not yet satisfactory, return to Step 2. Otherwise, continue to Step 7. This completes the process for synthesizing the hidden layer.

In the seventh step, a truth table should be prepared for the partitioned regions having data. The regions without data can be treated as "don't care" entries. Eighth, either a Karnaugh map or CAD software is employed to minimize the logic circuit design. The hidden nodes or hard-limiters which are not used in the minimized logic function should then be pruned. Ninth, the minimized DNN may be implemented through software or hardware. Tenth, a forward calculation should be executed to verify the network implementation.

EXAMPLE 1

This example has five input vectors belonging to two classes. The set $I^+$ contains the vectors 110, 111, and 001. The set $I^-$ contains 100 and 010. It is known that there exists a hyperplane that can cause the least-squares criterion function to be zero, yet result in the hyperplane failing to separate the two classes. A solution from the method of the invention is presented in FIG. 8a and the implementation is shown in FIG. 8b. It used only one layer and one node while the solution given by conventional methods requires three layers and five nodes.

EXAMPLE 2

Figure 9B:
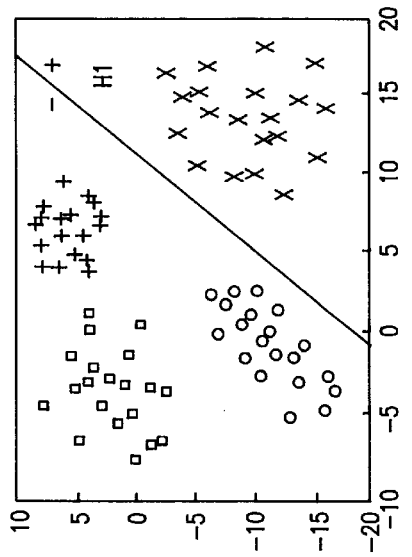
FIGS. 9a–9h are data cluster graphs during the partitioning process in accordance with the invention.
Figure 9D:
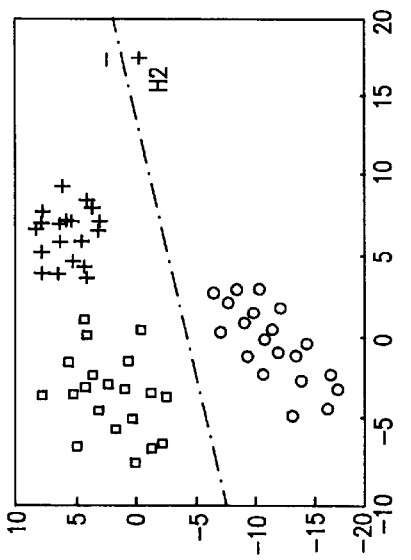
Figure 9A:
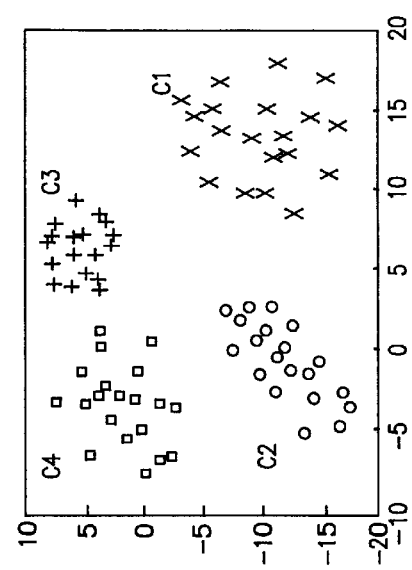
Figure 9C:
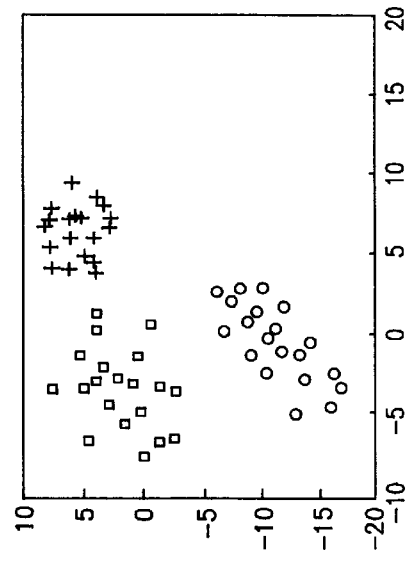
Figure 9E:
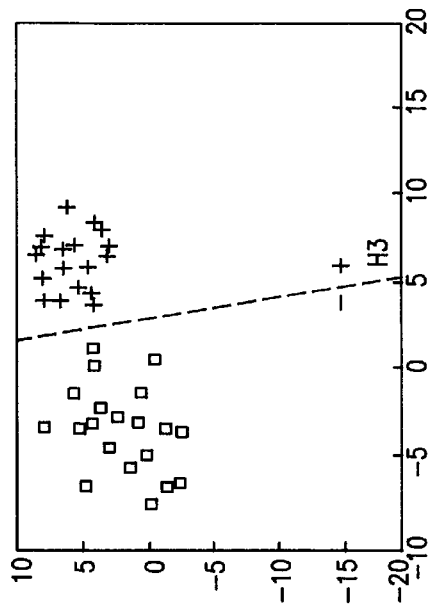
Figure 9F:
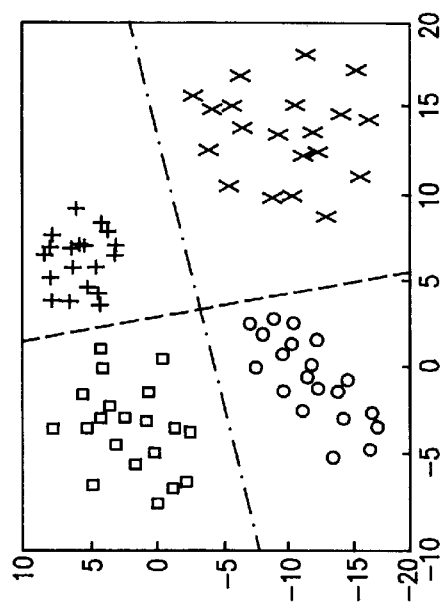
Figure 9G:
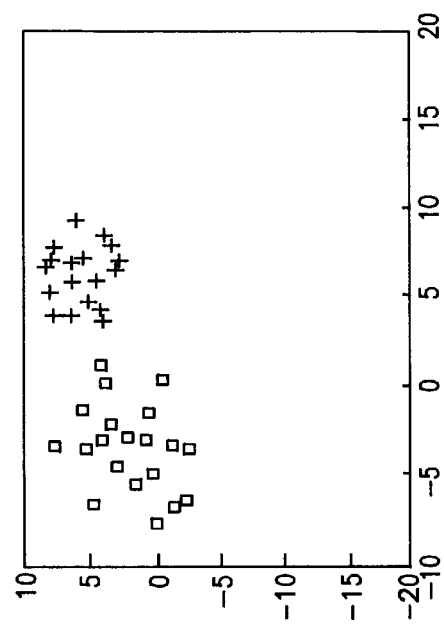

As shown in FIG. 9a, this example has four classes of data $C_1$ to $C_4$ and each class is a cluster. The design procedure starts with all four clusters shown in FIG. 9a. The hyperplane $H_1$ partitioning the input space, and the associated hidden node, are first determined in FIG. 9b. The $H_1$ separated the cluster $C_1$ from others, so $C_1$ as a satisfied subset can be removed and only three clusters are left in the training data set as shown in FIG. 9c. Based on the remaining data of the unsatisfied subset in FIG. 9c, the second hyperplane $H_2$ is determined as shown in FIG. 9d. The $H_2$ separates cluster $C_2$ from others, and then $C_2$ is removed from the training data set. Now only clusters $C_3$ and $C_4$ left in the training set as shown in FIG. 9e, and the third hyperplane $H_3$ totally separates them as shown in FIG. 9f. The partitioned input space and separated clusters are shown in FIG. 9g.

Figure 9H:
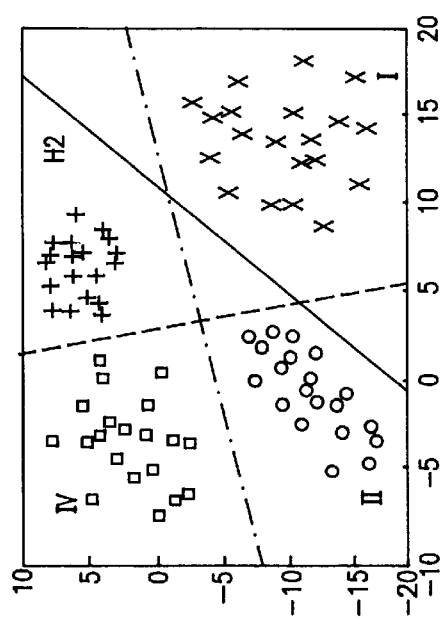

In training the output nodes, the four classes of data can be presented by two output bits, and each output node presents one of the bits. The truth table and Karnaugh map are shown in FIG. 10. The minimized logical functions for the output nodes are $d_1=\hat{y}_2$ and $d_2=\hat{y}_3$. Therefore, the $y_1$ and associated hyperplane $H_1$ are pruned. The partitioned input space with two hyperplanes is shown in FIG. 9h. A minimal implementation is shown in FIG. 11, in which the weight vector $w_1$=[0.84, −0.54] and $\theta_1$=10.03 are pruned, and other weights and thresholds are shown as well.

EXAMPLE 3

This example relates to the problem of classifying two classes of data that are not linearly separable as shown in FIG. 12. As a test, backpropagation and the known subspace inhibition filter algorithm were used to solve the problem of this example with the same set of training data. Even though the training was repeated several times with different initial weights, the backpropagation always converged to a local minimum. The subspace inhibition filter algorithm converges faster in the beginning, but it is also eventually converged to a local minimum as well.

By applying the method of the invention, the problem was solved in the first run, and the method needed only three hidden nodes to completely classify the two classes of data. The first hyperplane $H_1$ was determined with all data in the input space. Then only the data in the half-plan $H_1^-$ was used to train the second hidden node for the hyperplane $H_2$. Finally only the data within the intersection of $H_1^-$ and $H_2^-$ was used to train the third hidden nodes. Thus the data set was reduced to a linear-separable case and the third hyperplane $H_3$ totally separated the data set. The Karnaugh map used to minimize the output layer is shown in FIG. 13a. The minimized function of the output node is $d_{out}=y_2+\hat{y}_1 y_3$. One implementation is shown in FIG. 13b.

In sum, the invention provides a method for the design and training of discriminant neural networks. The invention applies Fisher's linear discriminant analysis recursively to modified data sets. Hidden nodes are applied to the network as needed, and the training data set is reduced while the training is in progress. The network structure is designed based on the principle that hidden nodes present hyperplanes to partition the input space and separate the data clusters into satisfied regions, and the output nodes provide the binary words which specify the partitioned regions. The partition-deletion method significantly accelerates the training process. Further, Boolean minimization may be applied to train the output nodes. This not only implements the output nodes with minimal connections but it also prunes the hidden nodes or hardlimiters. The new method, therefore, can synthesize a neural network with guaranteed convergence, fast training speed, and a simply structure for implementation.

As shown in Example 3, the method of the invention is at least $10^3$–$10^5$ times faster than backpropagation while yet still provides higher accuracy and simpler network structure. In Example 3, the proposed method required only 0.1 second to design a DNN for no-error classification on the training data while backpropagation converged to an incorrect local minimum after training for several hours using same workstation and same training data set.

We claim:

1. A method of training a discriminant neural network including a set of hidden nodes having associated weights, said method including the steps of:

loading a training data set and assigning it to a residual data set;

computing a vector associated with a first hidden node using the residual data set and a linear discriminant algorithm characterized by $$S_W = \sum_{x \in X_1} (x - m_1)(x - m_2)^1 + \sum_{x \in X_2} (x - m_2)(X - m_2)^1$$

where $S_W$ is a linear combination of covariance matrices, $X_1$, $X_2$ are the data sets of two different classes and $m_1$, $m_2$ are sample means of the two different classes;

projecting training data onto a hyperplane associated with said first hidden node;

determining the number and locations of hard-limiter thresholds associated with the first node; and repeating the above for successive hidden nodes after removing satisfied subsets from the training data until all partitioned regions of the input data space are satisfied, to train the discriminant neural network.

2. A method as claimed in claim 1, wherein said method further includes the steps of evaluating whether to add a hidden node, and adding a new hidden node under appropriate conditions.

3. A method as claimed in claim 1, wherein said method further includes the step of pruning unnecessary hidden nodes from the network.

4. A method as claimed in claim 1, wherein said method further includes the step of pruning hard-limiters from the network.

5. A method as claimed in claim 1, wherein said method further includes the step of training output nodes using boolean minimization techniques.

6. A discriminant neural network training system comprising:

means for loading a training data set and assigning it to a residual data set;

means for computing a vector associated with a first hidden node using the residual data set and a linear discriminant algorithm characterized by $$S_W = \sum_{x \in X_1} (x - m_1)(x - m_2)^1 + \sum_{x \in X_2} (x - m_2)(X - m_2)^1$$

where $S_W$ is a linear combination of covariance matrices, $X_1$, $X_2$ are the data sets of two different classes and $m_1$, $m_2$ are sample means of the two different classes;

means for projecting training data onto a hyperplane associated with said first hidden node;

means for determining the number and locations of hard-limiter thresholds associated with the first node; and means for repeating the above for successive hidden nodes after removing satisfied subsets from the training data until all partitioned regions of the input data space are satisfied, to train the discriminant neural network.

* * * * *